United States Patent [19]
Horton

[11] Patent Number: 5,162,018

[45] Date of Patent: Nov. 10, 1992

[54] AIR VENT SYSTEM

[76] Inventor: Donald L. Horton, 2710 N. Surrey Dr., Carrollton, Dallas County, Tex. 75006

[21] Appl. No.: 793,869

[22] Filed: Nov. 18, 1991

[51] Int. Cl.$^5$ .............................................. B60H 1/26
[52] U.S. Cl. ...................................... 454/76; 251/100; 251/351; 251/353; 454/152; 454/154; 454/323
[58] Field of Search ........................ 251/100, 351, 353; 454/76, 152, 154, 305, 306, 323, 324

[56] References Cited

U.S. PATENT DOCUMENTS

| | | | |
|---|---|---|---|
| 1,299,480 | 4/1919 | Kirby | 251/100 |
| 1,579,567 | 4/1926 | Schriner | 251/351 |
| 2,058,659 | 10/1936 | Bellanca | 454/76 |
| 2,524,974 | 10/1950 | Hickmott | 454/323 X |

*Primary Examiner*—Robert G. Nilson
*Attorney, Agent, or Firm*—Richards, Medlock & Andrews

[57] ABSTRACT

An air vent system having an inner tube slidably disposed within a liner. A lock mechanism is mounted at one end of the inner tube. A lock pin is disposed at one end of the liner and is constructed to engage the lock mechanism such that the air vent system can be selectively moved between an open position and a closed position.

20 Claims, 2 Drawing Sheets

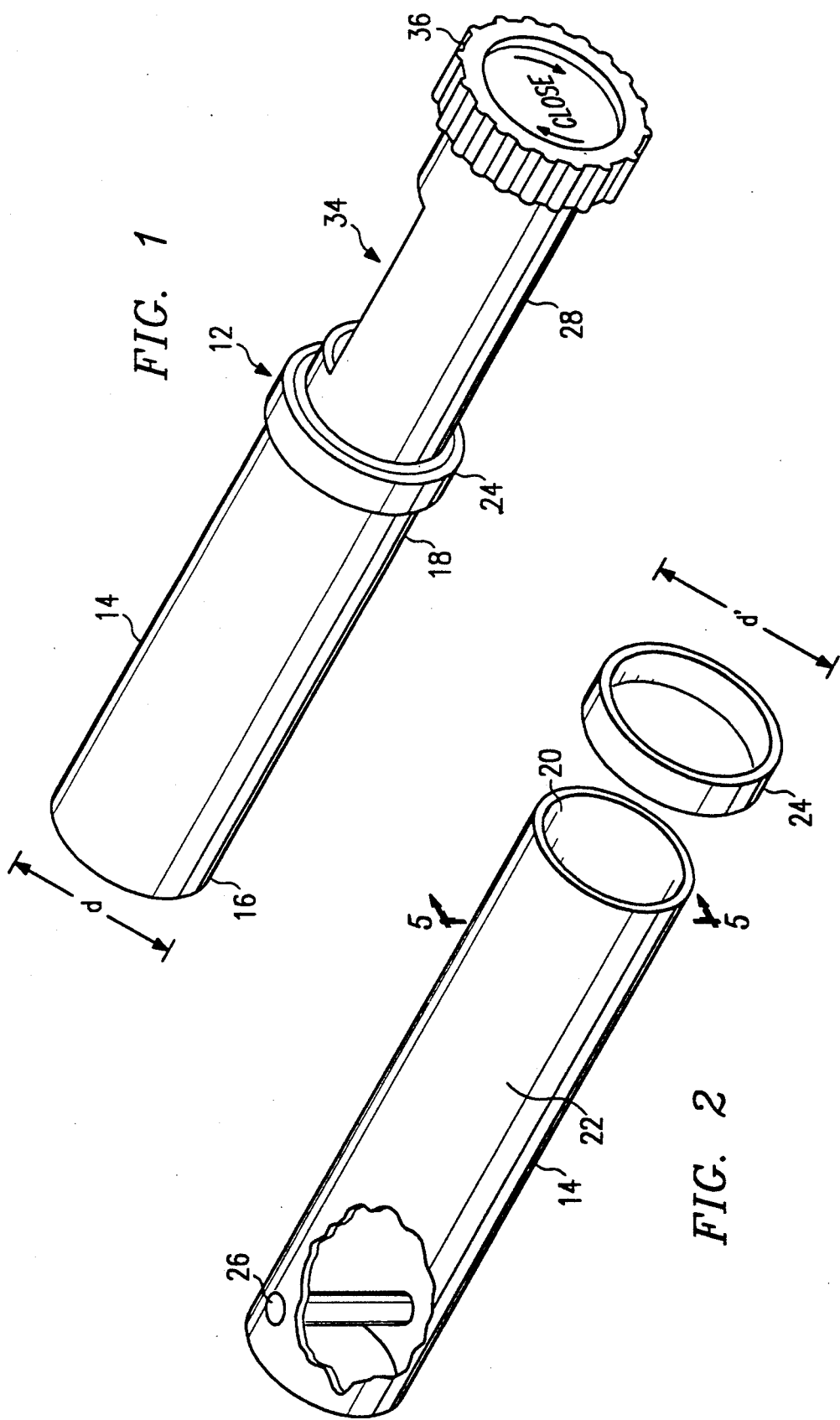

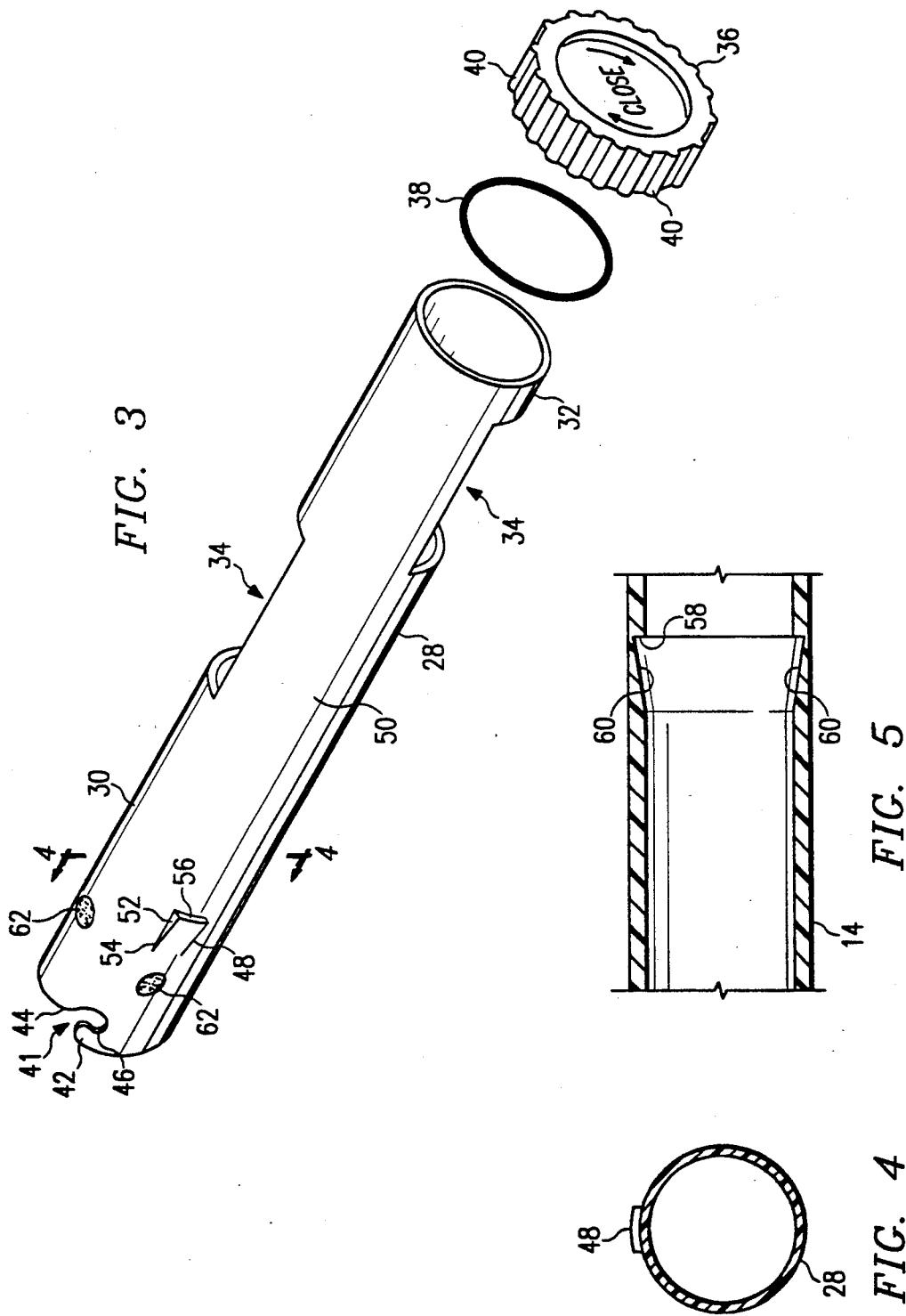

AIR VENT SYSTEM

TECHNICAL FIELD OF THE INVENTION

This invention relates to an air vent system constructed for use as original equipment or as a replacement part for existing vent systems in leisure aircraft.

BACKGROUND OF THE INVENTION

Air vent systems for leisure aircraft are well known. Such systems are designed to provide volume and directional control of ventilation within the aircraft cockpit during operation. However, it has been found that ventilation systems currently in use in leisure aircraft are prone to mechanical failure. The pilot's ability to control the flow of air through the cockpit can be impaired partially or completely due to such a mechanical failure. The absence of control over the ventilation of the cockpit can be annoying and potentially dangerous to the pilot and other persons in the cockpit, particularly if a ventilation system mechanical failure occurs while flying in extremely cold climates.

SUMMARY OF THE INVENTION

The air vent system of the present invention includes a liner having an air passageway formed therethrough. A lock pin is disposed at one end of the liner within the air passageway. An inner tube having an air exhaust aperture formed therethrough is slidably disposed within the liner. A lock mechanism is disposed on the inner tube and is constructed to engage the lock pin when the system is in a closed condition.

BRIEF DESCRIPTION OF THE DRAWINGS

A more complete understanding of the present invention and its advantages will be apparent from the following detailed description read in conjunction with the accompanying drawings in which:

FIG. 1 is an overall plan view of the air vent system of the present invention;

FIG. 2 is an exploded view of the liner of the air vent system o the present invention;

FIG. 3 is an exploded view of the inner tube of the air vent system of the present invention;

FIG. 4 is a rotated cross-sectional view of the inner tube of the air vent system of the present invention taken through line 4—4 of FIG. 3; and FIG. 5 is a cross-sectional view of the liner of the air vent system of the present invention taken through line 5—5 of FIG. 2.

DETAILED DESCRIPTION

The air vent system of the present invention is generally indicated at numeral 12 of FIG. 1. Vent system 12 includes liner 14 having a first end 16 and a second end 18. Liner 14 defines an air passageway therethrough and has an interior surface 20 and an exterior surface 22 as depicted in FIG. 2. It will be appreciated that liner 14 can have any cross-sectional structure without departing from the spirit and scope of the present invention discussed herein. However, in the preferred embodiment of the present invention, liner 14 has a substantially annular cross-section.

External diameter d of liner 14 is preferably determined by the size of existing ventilation tubes into which the air vent system of the present invention is to be placed. For example, ventilation tubes in some leisure aircraft have an internal diameter of approximately 1.9 inches. Accordingly, external diameter d of liner 14 would be approximately 1.9 inches in order to provide a tight fit between the existing ventilation tube and liner 14. It is to be appreciated that air vent system 12 of the present invention can be used in leisure aircraft or in any other situation in which a ventilation system is used. Liner 14 can be secured within an existing ventilation tube through any known means including the use of friction, glue, and/or screws.

Liner ring 24 is disposed on second end 18 of liner 14. External diameter d' of liner ring 24 is slightly greater than external diameter d of liner 14, thereby preventing air vent system 12 from being positioned too far into an existing ventilation tube. For example, when air vent system 12 is in position in a leisure aircraft, liner ring 24 will protrude from the dashboard of the aircraft while liner 14 will be disposed within the existing ventilation tube behind the dashboard.

Lock pin 26 is disposed proximal first end 16 of liner 14 as depicted in FIG. 2. In a preferred embodiment of the present invention, lock pin 26 is mounted at each of its ends to interior surface 20 of liner 14 and extends across the width of the air passageway formed through liner 14. In this embodiment, lock pin 26 passes through the axis of the air passageway formed through liner 14. The purpose and function of lock pin 26 will be discussed in greater detail below.

Inner tube 28 is slidably disposed within liner 14 as depicted in FIG. 1. Inner tube 28 has a first end 30 and a second end 32 as depicted in FIG. 3. As above-discussed with respect to liner 14, inner tube 28 can have any cross-sectional form provided it can be slidably disposed within liner 14. In the preferred embodiment depicted in the accompanying figures and described herein, inner tube 28 is annular in cross-section and has an external diameter slightly less than interior diameter of liner. For example, where the exterior diameter d of liner 14 is 1.9", the interior diameter of the air passageway formed through liner 14 will be approximately 1.7". Thus, the exterior diameter of inner tube 28 will be approximately 1.66" in order to provide a relatively close fit between liner 14 and inner tube 28.

Air exhaust aperture 34 is formed through inner tube 28 proximal second end 32. In the preferred embodiment of the present invention depicted in FIG. 3, two air exhaust apertures 34 are formed through inner tube 28 at diametrically opposed positions proximal second end 32. It will be appreciated that any number of air exhaust apertures can be formed through inner tube 28 without departing from the spirit and scope of the present invention.

A cap 36 is mounted at second end 32 of inner tube 28. Cap 36 obstructs the flow of air through second end 32 of inner tube 28, thereby causing the air moving through inner tube 28 to be exhausted through air exhaust apertures 34. Cap 36 has an O-ring 38 mounted thereon. O-ring 38 is dimensioned to provide an airtight seal between cap 36 and liner ring 24 when the air vent system 12 of the present invention is in a closed condition. It will be appreciated that O-ring 38 alternatively can be mounted on liner ring 24 in order to provide the desired airtight seal between cap 36 and liner 14. Cap 36 preferably includes grip enhancers 40 in order to facilitate operation of air vent system 12.

Locking mechanism 40 is disposed at first end 30 of inner tube 28. In a preferred embodiment of the present invention depicted in FIG. 3, locking mechanism 41 includes a J-shaped locking ramp 42 formed on inner tube 28. J-shaped locking ramp 42 includes open end 44 and closed end 46. J-shaped locking ramp 42 is constructed and dimensioned to engage lock pin 26 when air vent system 12 is in a closed condition. In the preferred embodiment depicted in FIG. 3, open end 44 is disposed in a clockwise position relative to closed end 46.

When inner tube 28 is moved toward first end 16 of liner 12, first end 30 of inner tube 28 will come into contact with lock pin 26. Inner tube 28 is then turned in order to cause lock pin 26 to engage J-shaped locking ramp 42. Because open end 44 is disposed in a clockwise position relative to closed end 46, air vent system 12 is closed by manually rotating cap 36 in a clockwise direction. It will be appreciated that the rotation of cap 36 will cause rotation of inner tube 28. As inner tube 28 is rotated, lock pin 26 engages J-shaped locking ramp 42, causing inner tube 28 to be drawn further into liner 12 in order to bring cap 36 into contact with liner ring 24. As above-discussed, an airtight seal is formed between cap 36 and liner ring 24 when system 12 is in the closed condition. The airtight seal prevents airflow from entering the cabin of the aircraft through the vent system. In addition, the airtight seal prevents the occurrence of whistling which can arise of a small amount of airflow is present.

System 12 can be selectively opened by manually rotating cap 36 in a counter-clockwise direction and pulling inner tube 28 outwardly from first end 16 to second end 18 of liner 14. It will be appreciated that as cap 36 is rotated in a counter-clockwise direction, J-shaped locking ramp 42 is moved about lock pin 26. Due to the structure of J-shaped locking ramp 42, inner tube 28 is forced outwardly, i.e., forced from the first end 16 toward second end 18 of liner 14, thereby breaking the seal between O-ring 38 and liner 14. Inner tube 28 can then be manually drawn from toward second end 18 of liner 14 in order to expose air exhaust aperture 34, thereby initiating the flow of air through inner tube 28 and into the cabin of the aircraft.

Drag stop 48 is mounted on exterior surface 50 of inner tube 28 as depicted in FIG. 4. In a preferred embodiment of the present invention, drag stop 48 is formed from a U-shaped section 52 of inner tube 28 wherein open end 54 of the U-shaped section is disposed proximal first end 30 of inner tube 28 relative to closed end 56 of U-shaped section 52. In this preferred embodiment, closed end 56 of U-shaped section 52 is raised above the level of external surface 50 and is outwardly biased such that closed end 56 of U-shaped section 52 drags against interior surface 20 of liner 14 as inner tube 28 is slid through liner 14. Motion of inner tube 28 within liner 14 is thus constrained by friction between drag stop 48 and liner 14. In an alternative embodiment of the present invention, drag stop 48 can be outwardly spring-biased in order to create the desired frictional drag between liner 14 and inner tube 28.

Drag stop shoulder 58 is formed about the circumference of interior wall 20 of liner 14 at a predetermined position as depicted in FIG. 5. In a preferred embodiment, stop shoulder 58 is approximately ¾" from second end 18 of liner 14. Stop ramp 60 is formed about the circumference of interior wall 20 adjacent shoulder 58. As above-discussed, drag stop 48 drags on interior wall 20 of liner 14 as inner tube 28 is slid through liner 14 due to the outward biasing of drag stop 48. It will be appreciated that as inner tube 28 is slid toward second end 18 of liner 14, drag stop 48 will encounter stop ramp 60. As drag stop 48 is moved along stop ramp 60, the internal diameter of liner 14 increases. The outward biasing of drag stop 48 causes it to be forced outwardly from inner tube 28. Thus, movement of inner tube 28 toward second end 18 of liner 14 is ceased when drag stop 48 reaches drag stop shoulder 58, i.e., the stop position. As inner tube 28 is forced toward first end 16 of liner 14 from the stop position, drag stop 48 is forced inwardly by interior surface 20 of liner 14, thereby permitting inner tube 28 to be forced into engagement with lock pin 26.

In a preferred embodiment of the present invention, friction devices 62 are disposed on exterior surface 50 of inner tube 28. Friction devices 62 are dimensioned to cause additional drag between inner tube 28 and liner 14, thereby allowing an operator to selectively adjust air vent system 12. Friction devices 62 can be constructed of a variety of known deformable materials. For example, it has been found that Velcro® loop material can be used in order to create the requisite drag between inner tube 28 and liner 14. It will be appreciated that friction devices 62 also provide added stability to inner tube 28 relative to liner 14.

Air vent system 12 can be constructed of a variety of materials including most plastics and metals. Polyvinylchloride (PVC) has been found to be particularly suited for use in connection with system 12 due to its relatively low cost and physical characteristics.

Although the air vent system of the present invention has been described in detail herein with respect to specific preferred embodiments, it will be evident that various and further modifications are possible without departing from the true spirit and scope of the present invention.

What is claimed is:

1. An air vent system comprising:
   a liner having a first end and a second end, said liner defining an air passageway therethrough, said liner having an inner surface adjacent said air passageway and an outer surface opposite said inner surface;
   a lock pin disposed on said liner; and
   an inner tube slidably disposed within said liner, said inner tube defining an air passageway therethrough, said inner tube having an outer surface and an inner surface, said inner tube having a first end and a second end, said inner tube defining a first exhaust aperture therethrough, said inner tube having a lock mechanism disposed thereon, said lock mechanism being constructed selectively to engage said lock pin whereby said air vent system can be selectively moved between an open position and a closed position.

2. The air vent system of claim 1 wherein said lock pin is disposed on said inner surface of said liner proximal said first end of said liner and wherein said lock mechanism is disposed on said inner tube proximal said first end of said inner tube.

3. The air vent system of claim 1 wherein said air exhaust aperture defined through said inner tube is disposed proximal said first end of said inner tube.

4. The air vent system of claim 1 wherein said lock mechanism comprises a first lock ramp defined on said inner tube, said first lock ramp being constructed selectively to engage said lock pin when said air vent system is in said closed position.

5. The air vent system of claim 4 wherein said lock mechanism further comprises a second lock ramp defined on said inner tube at a position opposite said first lock ramp defined on said inner tube, said second lock ramp being constructed selectively to engage said lock pin when said air vent system is in said closed position.

6. The air vent system of claim 4 wherein said first lock ramp defined on said inner tube has an open end and a closed end, said closed end of said first lock ramp being disposed proximal said second end of said inner tube relative to said open end of said first lock ramp whereby said lock pin causes said inner tube to move toward said first end of said liner as said lock pin passes from said open end of said first lock ramp to said closed end of said first lock ramp and whereby said lock pin causes said inner tube to move toward said second end of said liner as said lock pin passes from said closed end of said first lock ramp to said open end of said first lock ramp.

7. The air vent system of claim 1 further comprising a stop device disposed on said outer surface of said inner tube proximal said first end of said inner tube and a catch device disposed on said inner surface of said liner proximal said second end of said liner, said stop device being constructed to engage said catch device when said inner tube reaches a predetermined position as it is slid through said liner.

8. The air vent system of claim 1 further comprising a plurality of friction devices defined on said outer surface of said inner tube, said friction devices being constructed to cause frictional drag between said outer surface of said inner tube and said inner surface of said liner when said inner tube is slid through said liner.

9. The air vent system of claim 1 wherein said liner and said inner tube have circular cross sections.

10. The air vent system of claim 1 further comprising an O-ring disposed on said liner at said second end of said liner and a cap disposed on said inner tube at said second end of said inner tube, said cap being constructed to engage s id O-ring when said air vent system is in said closed position.

11. The air vent system of claim 1 wherein said inner tube defines a plurality of exhaust apertures therethrough.

12. An air vent system comprising:
a liner having a first end and a second end, said liner defining an air passageway therethrough, said liner having an inner surface adjacent said air passageway and an outer surface opposite said inner surface;
a lock pin disposed on said inner surface of said liner proximal said first end of said liner; and
an inner tube slidably disposed within said liner, said inner tube defining an air passageway therethrough, said inner tube having and outer surface and an inner surface, said inner tube having a first end and a second end, said inner tube defining a first exhaust aperture therethrough, said inner tube defining a first lock ramp proximal said first end of said inner tube, said first lock ramp being constructed selectively to engage said lock pin whereby said air vent can be selectively moved between an open position and a closed position.

13. The air vent system of claim 12 wherein said first lock ramp defined on said inner tube has an open end and a closed end, said closed end of said first lock ramp being disposed proximal said second end of said inner tube relative to said open end of said first lock ramp whereby said lock pin causes said inner tube to move toward said first end of said liner as said lock pin passes from said open end of said first lock ramp to said closed end of said first lock ramp and whereby said lock pin causes said inner tube to move toward said second end of said liner as said lock pin passes from said closed end of said first lock ramp to said open end of said first lock ramp.

14. The air vent system of claim 12 wherein said inner tube defines a second lock ramp proximal said first end of said inner tube, said second lock ramp being defined on said inner tube at a position opposite said first lock ramp.

15. The air vent system of claim 12 wherein said inner tube defines a plurality of air exhaust apertures therethrough.

16. The air vent system of claim 12 further comprising a stop device disposed on said outer surface of said inner tube and a catch device disposed on said inner surface of said liner, said stop device being constructed to engage said catch device when said liner reaches a predetermined position as it is slid through said liner.

17. The air vent system of claim 12 further comprising a plurality of friction devices defined on said outer surface of said inner tube, said friction devices having a dimension sufficient to cause frictional drag between said inner tube and said liner when said inner tube is slid through s id liner.

18. The air vent system of claim 12 wherein said liner and said inner tube have circular cross sections.

19. An air vent system comprising:
a liner having a first end and a second end, said liner defining an air passageway therethrough, said liner having an inner surface adjacent said air passageway and an outer surface opposite said inner surface;
an O-ring disposed on said liner at said second end of said liner;
a lock pin disposed on said liner on said inner surface of said liner at said first end of said liner;
an inner tube slidably disposed within said liner, said inner tube defining an air passageway therethrough, said inner tube having an outer surface and an inner surface, said inner tube defining a first exhaust aperture therethrough, said inner tube defining a first lock ramp at said first end of said inner tube and defining a second lock ramp opposite said first lock ramp, said first and second lock ramps being constructed to engage said lock pin whereby said air vent system can be selectively moved between an open position and a closed position; and
a cap 36 disposed at said second end of said inner tube, said cap being constructed to engage said O-ring disposed on said liner whereby an air-tight seal is created between said inner tube and said liner when said air vent system is in said closed position.

20. The air vent system of claim 19 wherein said first and said second lock ramps defined on said inner tube each have an open end and a closed end, said closed ends of said lock ramps being disposed proximal said second end of said inner tube relative to said open ends of said lock ramps whereby said lock pin causes said inner tube to move toward said first end of said liner as said lock pin passes from said open ends of said lock ramps to said closed ends of said lock ramps and whereby said lock pin causes said inner tube to move toward said second end of said liner as said lock pin passes from said closed ends of said lock ramps to said open ends of said lock ramps.

* * * * *

UNITED STATES PATENT AND TRADEMARK OFFICE
CERTIFICATE OF CORRECTION

PATENT NO. : 5,162,018
DATED : November 10, 1992
INVENTOR(S) : Horton

It is certified that error appears in the above-identified patent and that said Letters Patent is hereby corrected as shown below:

Column 2, line 66, delete "40" and insert therefor --41--.
Column 3, line 26, delete "of" and insert therefor --if--.
Column 3, line 38, delete "from".
Column 5, line 52, delete "and" and insert therefor --an--.
Column 6, line 26, delete "s id" and insert therefor --said--.

Signed and Sealed this

Twenty-second Day of March, 1994

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO.  : 5,162,018
DATED       : November 10, 1992
INVENTOR(S) : Horton

It is certified that error appears in the above-identified patent and that said Letters Patent is hereby corrected as shown below:

Column 2, line 66, delete "40" and insert therefor --41--.
Column 3, line 26, delete "of" and insert therefor --if--.
Column 3, line 38, delete "from".
Column 5, line 53, delete "and" and insert therefor --an--.
Column 6, line 26, delete "s id" and insert therefor --said--.

This certificate supersedes the Certificate of Correction issued March 22, 1994.

Signed and Sealed this

Twentieth Day of September, 1994

Attest:

BRUCE LEHMAN

Attesting Officer

Commissioner of Patents and Trademarks